(12) United States Patent
Ohgitani et al.

(10) Patent No.: US 9,735,404 B2
(45) Date of Patent: Aug. 15, 2017

(54) BATTERY CASE WITH GAS EXHAUSTING REINFORCEMENT

(71) Applicant: KABUSHIKI KAISHA TOYOTA JIDOSHOKKI, Kariya-shi, Aichi (JP)

(72) Inventors: Ikkei Ohgitani, Kariya (JP); Yoshio Ojima, Kariya (JP); Takahiro Fukagawa, Kariya (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 597 days.

(21) Appl. No.: 14/158,172

(22) Filed: Jan. 17, 2014

(65) Prior Publication Data

US 2014/0205878 A1 Jul. 24, 2014

(30) Foreign Application Priority Data

Jan. 21, 2013 (JP) ................................ 2013-008520

(51) Int. Cl.
| | |
|---|---|
| H01M 2/10 | (2006.01) |
| H01M 2/12 | (2006.01) |
| B60L 11/18 | (2006.01) |
| H01M 10/625 | (2014.01) |
| H01M 10/6563 | (2014.01) |

(Continued)

(52) U.S. Cl.
CPC ....... H01M 2/1083 (2013.01); B60L 11/1879 (2013.01); H01M 2/1072 (2013.01); H01M 2/1211 (2013.01); H01M 2/1252 (2013.01); H01M 10/613 (2015.04); H01M 10/625 (2015.04); H01M 10/6556 (2015.04); H01M 10/6563 (2015.04); Y02T 10/705 (2013.01); Y02T 10/7005 (2013.01)

(58) Field of Classification Search
CPC .......... H01M 10/6566; H01M 10/625; H01M 2/1211
USPC ........................................... 429/87
See application file for complete search history.

(56) References Cited

U.S. PATENT DOCUMENTS 6,094,927 A * 8/2000 Anazawa ........... B60H 1/00278
62/239
2011/0027632 A1 2/2011 Higashino et al.
(Continued)

FOREIGN PATENT DOCUMENTS

| CN | 101834285 A | 9/2010 |
|---|---|---|
| CN | 202633396 U | 12/2012 |
| JP | 7-215070 | 8/1995 |

(Continued)

OTHER PUBLICATIONS

Machine translation of JP 2011-258426 A provided by JPO, retrieved Mar. 22, 2016, dated Dec. 22, 2011.*

*Primary Examiner* — Maria J Laios
*Assistant Examiner* — Robert S Carrico
(74) *Attorney, Agent, or Firm* — Sughrue Mion, PLLC

(57) ABSTRACT

A battery case for mounting under a floor of a vehicle comprises a case body containing a battery module and a cover for closing over an opening of the case body. A reinforcement member for reinforcing the case body is attached to an outer surface of the case body. The case body is provided with a gas circulation hole for letting a gas flow from within the case body into the reinforcement member. The reinforcement member is provided with a gas exhaust port for letting out the gas having flown into the reinforcement member.

5 Claims, 5 Drawing Sheets

(51) Int. Cl.
*H01M 10/6556* (2014.01)
*H01M 10/613* (2014.01)

(56) References Cited

U.S. PATENT DOCUMENTS

| | | | | |
|---|---|---|---|---|
| 2011/0195284 A1* | 8/2011 | Yasui | ......... | H01M 2/0242 |
| | | | | 429/82 |
| 2012/0288738 A1* | 11/2012 | Yasui | ......... | H01M 2/1022 |
| | | | | 429/82 |

FOREIGN PATENT DOCUMENTS

| | | |
|---|---|---|
| JP | 11-041710 | 2/1999 |
| JP | 2005-339932 A | 12/2005 |
| JP | 2011-70872 A | 4/2011 |
| JP | 2011-129668 A | 6/2011 |
| JP | 2011-258426 A | 12/2011 |
| JP | 2012-79510 A | 4/2012 |

* cited by examiner

BATTERY CASE WITH GAS EXHAUSTING REINFORCEMENT

BACKGROUND OF THE INVENTION

Field of the Invention

One aspect of the present invention relates to a battery case for mounting under a floor of a vehicle.

Related Background Art

As a conventional battery case, one disclosed in Japanese Patent Application Laid-Open No. 2011-70872 (hereinafter referred to as "Patent Literature 1") has been known, for example. The battery case disclosed in Patent Literature 1 comprises a housing for containing a battery block, a substrate provided so as to cover an open end of the housing, a partition member disposed above the substrate, and a lid provided so as to cover the upper side of the partition member. The partition member is provided with exhaust passages for letting out high-temperature gases generated from batteries of the battery block by short-circuiting and the like and an exhaust hole communicating with the exhaust passages.

SUMMARY OF THE INVENTION

However, the following problem exists in the prior art mentioned above. That is, when mounting the battery case under the floor of the vehicle, the high-temperature gases generated from the batteries are easy to be let out of the vehicle but must be cooled before being let out. This makes it necessary to provide a cooling duct on the inside or outside of the battery case in order to cool the high-temperature gases. This increases cost and worsens productivity. That also makes the battery case bulky, whereby a space for mounting the battery case may be hard to secure.

It is an object of one aspect of the present invention to provide a battery case which can secure a mounting space under a floor of a vehicle while lowering cost and improving productivity.

The battery case in accordance with one aspect of the present invention is a battery case for mounting under a floor of a vehicle, the battery case comprising a case body containing a battery module and a cover for closing over an opening of the case body; wherein a reinforcement member for reinforcing the case body is attached to an outer surface of the case body; wherein the case body is provided with a gas circulation hole for letting a gas flow from within the case body into the reinforcement member; and wherein the reinforcement member is provided with a gas exhaust port for letting out the gas having flown into the reinforcement member.

Thus, the gas within the case is let out of the vehicle through the reinforcement member in the battery case in accordance with one aspect of the present invention. Here, the reinforcement member also acts as an exhaust device, thereby making it unnecessary to add new components such as ducts. This can secure a mounting space under the floor of the vehicle while lowering cost and improving productivity.

The battery module may be provided with an exhaust port for letting out a gas generated within the battery module and an exhaust duct communicating with the exhaust port, the exhaust duct being connected to the gas circulation hole. In such a structure, a high-temperature gas generated in the battery module by short-circuiting and the like flows within the reinforcement member acting as an exhaust device. Here, the reinforcement member attached to the outer surface of the case body of the battery case under the floor of the vehicle is cooled by a headwind caused by traveling and the like, so that the high-temperature gas is cooled before being let out of the vehicle through the reinforcement member. Therefore, no dedicated cooling duct is necessary when letting out the high-temperature gas.

Here, the exhaust duct may be connected to the gas circulation hole while being raised to the cover. In this case, water, if any, entering the reinforcement member from the gas exhaust port of the reinforcement member will not invade the battery module unless it reaches the vicinity of the cover.

The case body or cover may be provided with an air inlet part for introducing cooling air into the case body. In a structure in which the cooling air is thus introduced into the case body, a constituent for letting out the air warmed after cooling the battery module is necessary. Here, letting out the warmed air through the reinforcement member inhibits foreign matters from entering the battery case from the exhaust passage.

The reinforcement member may be attached to the outer surface of the case body by welding at a plurality of spots. A gap with the case body is formed between the welding spots of the reinforcement member. The gap forms the gas exhaust port. In this case, a gap which is a so-called joggle formed between the welding spots of the reinforcement member at the time of spot welding is utilized as the gas exhaust port, which makes it unnecessary to process the reinforcement member additionally in order to form the gas exhaust port.

One aspect of the present invention can secure a space for mounting a battery case under a floor of a vehicle while lowering cost and improving productivity.

DESCRIPTION OF THE PREFERRED EMBODIMENTS

In the following, an embodiment of the battery case in accordance with one aspect of the present invention will be explained in detail with reference to the drawings.

Figure 1:
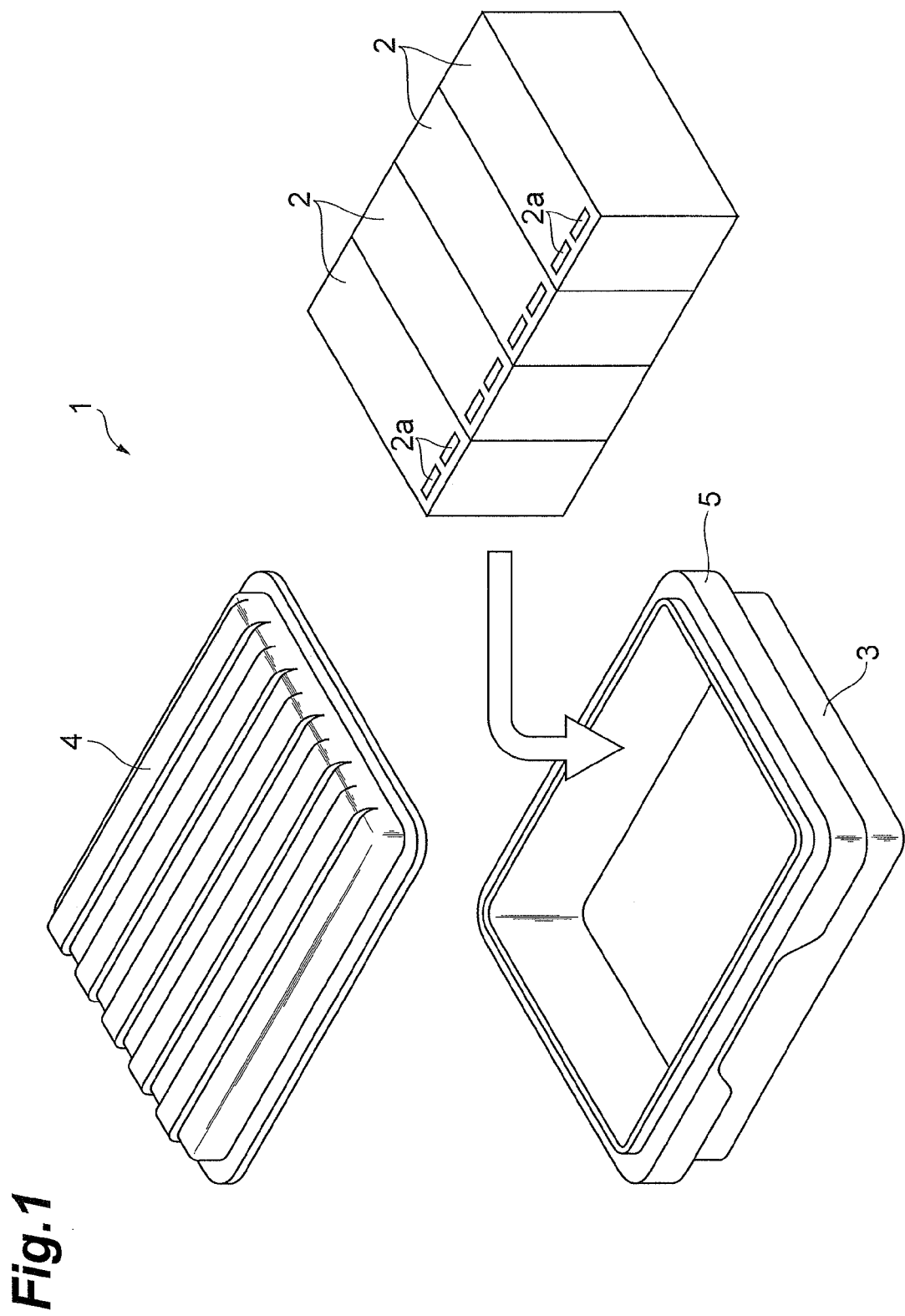
FIG. 1 is an exploded (partly abridged) perspective view illustrating an embodiment of the battery case in accordance with one aspect of the present invention.

FIG. 1 is an exploded (partly abridged) perspective view illustrating an embodiment of the battery case in accordance with one aspect of the present invention. In the drawing, the battery case 1 of this embodiment is mounted under a floor of a vehicle such as an electric vehicle.

The battery case 1 comprises a box-shaped case body 3 containing a plurality of (4 here) battery modules 2 in a row and a cover 4 for closing over an opening of the case body 3. Each battery module 2 is constructed by connecting a plurality of battery cells (e.g., lithium-ion cells), which are not depicted, together. The upper face of each battery module 2 is provided with two exhaust ports 2a for letting out high-temperature gases generated from the batteries because of failures such as short-circuiting.

Figure 2:
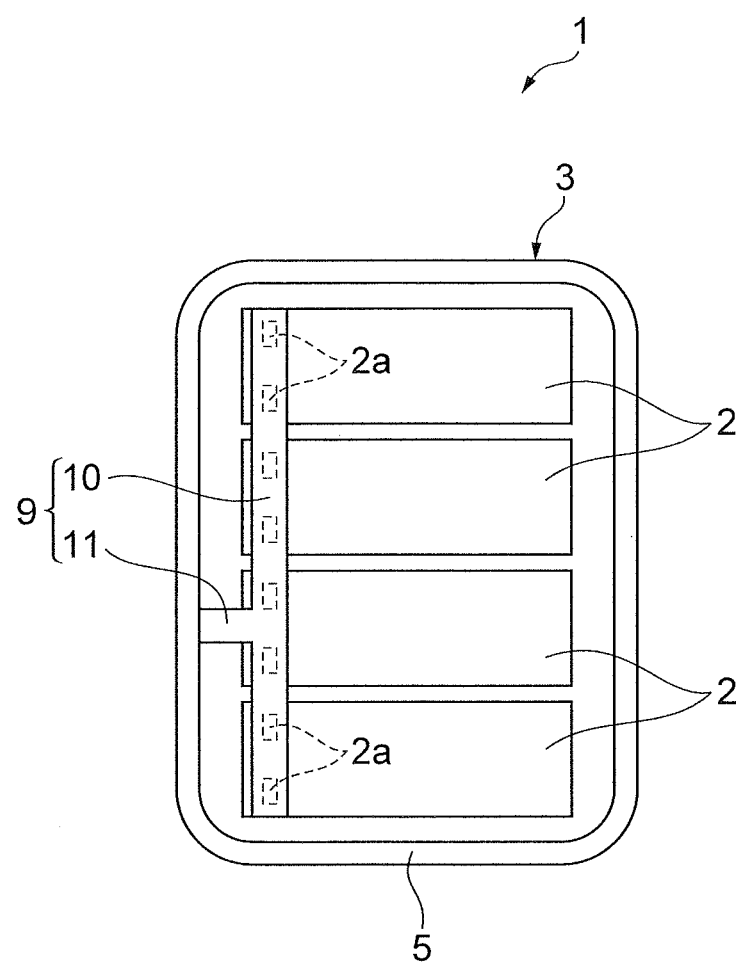
FIG. 2 is a plan view illustrating the battery case depicted in FIG. 1 without its cover.
Figure 3:
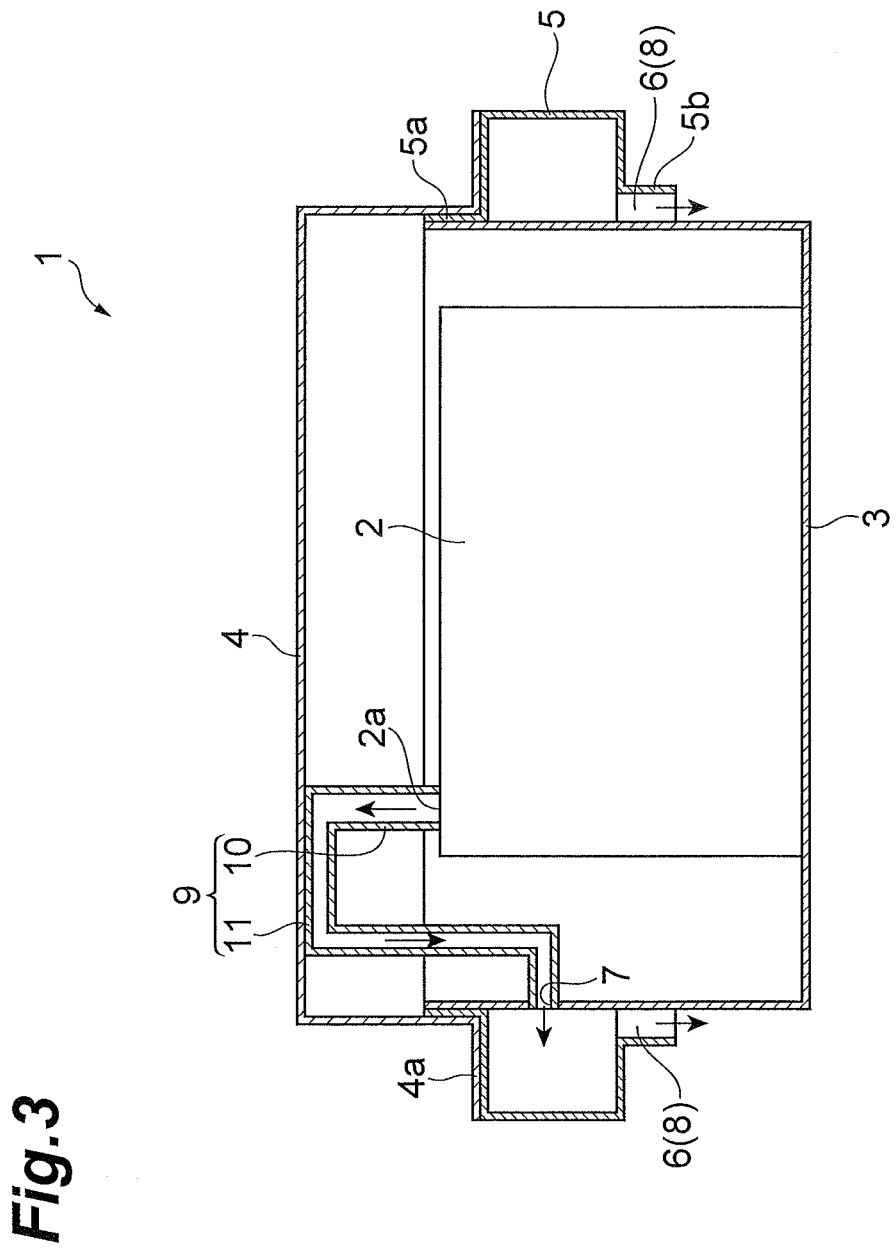
FIG. 3 is a sectional view of the battery case depicted in FIG. 1.

As FIGS. 2 and 3 also illustrate, a reinforcement (reinforcement member) 5 having a hat-shaped cross section for reinforcing the case body 3 is attached to an upper portion of the outer side face of the case body 3. The reinforcement 5 is formed by a sheet metal. The reinforcement 5 is continuously provided all around the outer side face of the case body 3 and forms a closed structure with the case body 3.

Specifically, upper and lower projections 5a, 5b of the reinforcement 5 are joined to the outer side face of the case body 3 by spot welding. Here, in order to inhibit noise from being generated by the case body 3 and the reinforcement 5 coming into contact with each other, gaps 6 (see FIG. 3) with the case body 3 are partly formed between the welding spots of the lower projection 5b of the reinforcement 5. The gaps 6 are so-called joggles. That is, the gaps 6 are formed at a plurality of unwelded locations between the case body 3 and the reinforcement 5. The gaps 6 may be formed either uniformly all around the reinforcement 5 or only at locations which are unlikely to be wet with water.

One side wall of the case body 3 is formed with a gas circulation hole 7 (see FIG. 3) for letting a gas flow from within the case body 3 into the reinforcement 5. The gap 6 between the lower projection 5b of the reinforcement 5 and the case body 3 forms a gas exhaust port 8 (see FIG. 3) for the gas having flown into the reinforcement 5 to be let out of the battery case 1.

A lower end portion of the cover 4 is provided with a flange 4a. The flange 4a is attached to the reinforcement 5 with a waterproof packing (not depicted) interposed therebetween.

The battery case 1 further comprises an exhaust duct 9 which is attached to the upper faces of the battery modules 2 and connects the exhaust ports 2a of the battery modules 2 to the gas circulation hole 7 formed in the case body 3. The exhaust duct 9 is constituted by a duct bank part 10 formed so as to communicate with the exhaust ports 2a of the battery modules 2 and a connection duct part 11 for connecting the duct bank part 10 to the gas circulation hole 7 of the case body 3. The connection duct part 11 extends substantially like letter U so as to rise to the rear face of the cover 4 in the state where the cover 4 closes the opening of the case body 3.

When the exhaust duct 9 is thus constructed by the duct bank part 10 and the connection duct part 11, only one gas circulation hole 7 is necessary for the case body 3. The duct bank part 10 and the connection duct part 11 may be formed integrally with each other or joined to each other.

In thus constructed battery case 1, high-temperature gases emitted from the exhaust ports 2a of the battery modules 2 pass through the exhaust duct 9, so as to flow into the reinforcement 5 from the gas circulation hole 7 of the case body 3. Then, while being cooled and dispersed through the reinforcement 5, the gases are let out of the battery case 1 from a plurality of gas exhaust ports 8.

Figure 4:
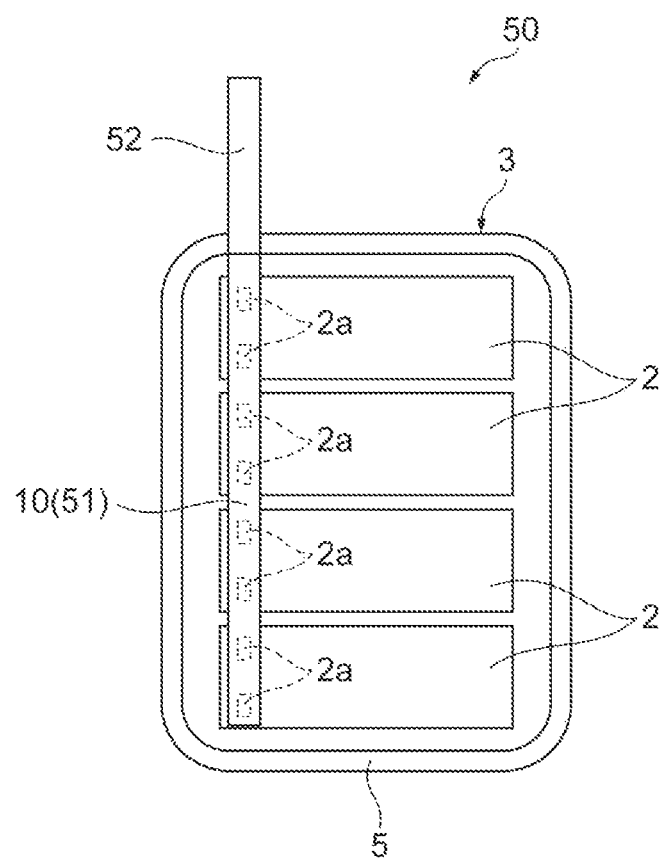
FIG. 4 is a plan view illustrating an example of conventional cases without its cover.

FIG. 4 illustrates an example of conventional battery cases as a comparative example. An exhaust duct 51 in the battery case 50 illustrated in FIG. 4 is constructed by the duct bank part 10 alone without the above-mentioned connection duct part 11. The battery case 50 further comprises an outer duct 52, which is connected to the exhaust duct 51 in a cover (not depicted) and extends to the outside of the battery case 1. The other structures are the same as those of the above-mentioned battery case 1.

Meanwhile, gases emitted from the exhaust ports 2a of the battery modules 2 have such a high temperature that the outer duct 52 is required to be elongated in order to cool the gases and let the cooled gases out of the vehicle. This makes the battery case 50 bulky as a whole, whereby a space for mounting the battery case 50 under the floor of the vehicle may become hard to secure.

By contrast, the embodiment forms the gas circulation hole 7 at a position corresponding to the reinforcement 5 in one side wall of the case body 3 and connects the exhaust ports 2a of the battery modules 2 to the gas circulation hole 7 through the exhaust duct 9, whereby the high-temperature gases emitted from the exhaust ports 2a of the battery modules 2 flow through the exhaust duct 9 and reinforcement 5, so as to be let out of the battery case 1 through the gaps 6 (gas exhaust ports 8) between the case body 3 and the reinforcement 5. Since the battery case 1 is arranged under the floor of the vehicle (on the outside of the vehicle), the reinforcement 5 attached to the outer side face of the case body 3 is cooled by a headwind caused as the vehicle travels and the like. Hence, the high-temperature gases are cooled by flowing through the reinforcement 5 having a closed structure. Thus, the reinforcement 5, which is a reinforcement member for the case body 3, is utilized for cooling the high-temperature gases emitted from the exhaust ports 2a of the battery modules 2 and letting them out of the battery case 1, whereby no outer duct for cooling is necessary on the outside of the battery case 1. This prevents the battery case 1 from becoming bulky in horizontal direction, so that a space for mounting the battery case 1 under the floor of the vehicle can be secured.

Since the exhaust duct 9 is raised to the rear face of the cover 4, water, if any, entering the reinforcement 5 from the gaps 6 (gas exhaust ports 8) between the case body 3 and the reinforcement 5 will not invade the battery module 2 through the exhaust duct 9 unless it reaches the vicinity of the rear face of the cover 4.

While the exhaust duct 9 is extended substantially like letter U so as to rise to the rear face of the cover 4 in the embodiment, it is not necessary to do so in particular when there is substantially no possibility of water reaching the upper surface height position of the battery modules 2.

While the exhaust duct 9 is constituted by the duct bank part 10 and the connection duct part 11, this structure is not restrictive; for example, exhaust ducts may be prepared by the same number as with the battery modules 2, while forming one side wall of the case body 3 with a plurality of gas circulation holes 7 and connecting the exhaust ports 2a of the battery modules 2 to the gas circulation holes 7 with the discrete exhaust ducts.

Figure 5:
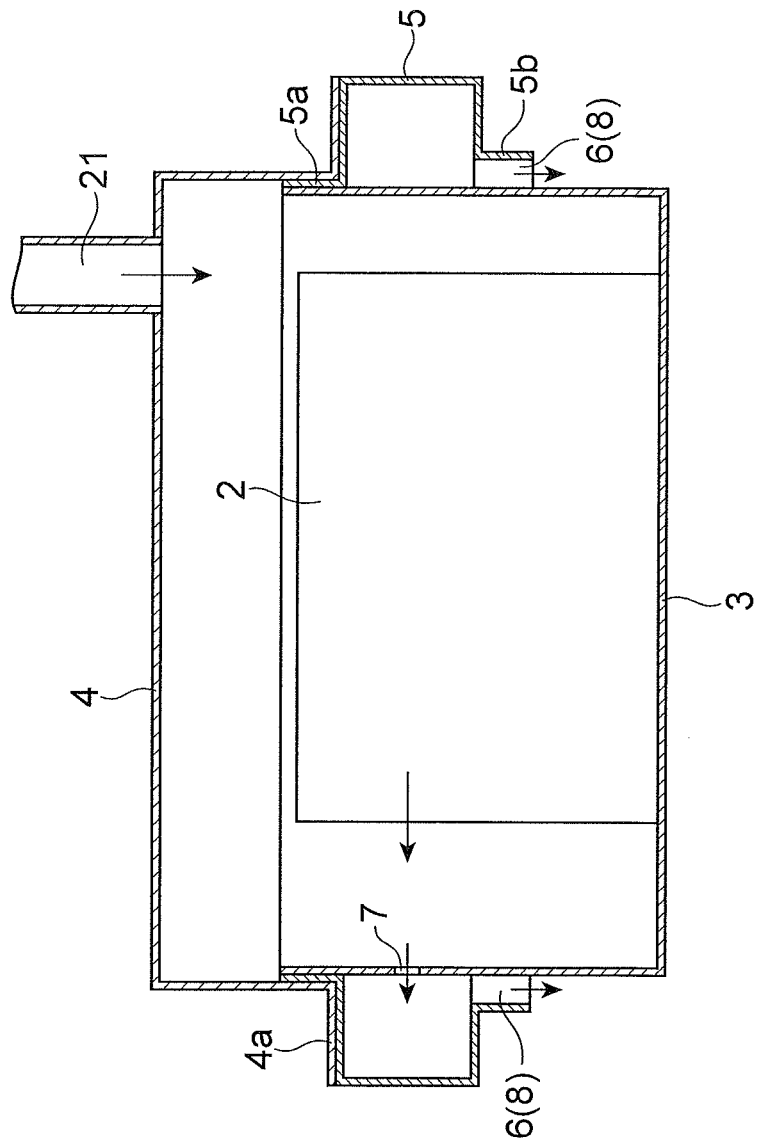
FIG. 5 is a sectional view illustrating another embodiment of the battery case in accordance with one aspect of the present invention.

FIG. 5 is a sectional view illustrating another embodiment of the battery case in accordance with one aspect of the present invention. In the drawings, the members identical or equivalent to those in the previous embodiment are referred to with the same signs while omitting their explanations.

In the drawing, as in the previous embodiment, the battery case 20 of this embodiment comprises a case body 3 and a cover 4, while a reinforcement 5 is attached to the case body 3. One side wall of the case body 3 is formed with a gas circulation hole 7 for letting a gas flow from within the case body 3 into the reinforcement 5 as in the previous embodiment. The battery case 20 is not equipped with the above-mentioned exhaust duct 9.

An intake duct 21 is attached to the cover 4 at a location opposite to the gas circulation hole 7. The intake duct 21 forms an air inlet part for introducing cooling air into the case body 3.

Meanwhile, batteries for electric vehicles attain high temperatures because of large amounts of current flowing therethrough during quick charging and traveling under heavy load. This makes it necessary to cool the battery modules 2 containing a plurality of batteries.

When the cooling air is introduced from the intake duct 21 into the battery case 20 by a cooling fan (not depicted), each of the battery modules 2 is cooled thereby. This generates warmed air (hot wind) within the battery case 20. The hot wind flows into the reinforcement 5 from the gas circulation hole 7 of the case body 3 and further passes through the reinforcement 5, so as to be let out of the battery case 20 through gaps 6 (gas exhaust ports 8) between the case body 3 and the reinforcement 5.

The hot wind generated by cooling the battery modules 2 is thus let out of the battery case 20 by utilizing the reinforcement 5 acting as a reinforcement member for the case body 3 in this embodiment, whereby, even during traveling rough roads abound with foreign matters such as gravels and mud, the narrow gas exhaust ports 8 and a flow path in the reinforcement 5 can prevent the foreign matters from entering the battery case 20. Since it is unnecessary to additionally provide a constituent for letting out the air after cooling the battery modules 2 therewith, productivity can be increased while restraining cost from rising. Also, a space for mounting the battery case 20 under the floor of the vehicle can be secured.

The intake duct 21, which is attached to the cover 4 in this embodiment, may be attached to the case body 3 at a location opposite to the gas circulation hole 7.

While some embodiments of the battery case in accordance with one aspect of the present invention are explained in the foregoing, one aspect of the present invention is not limited thereto.

For example, while the above-mentioned embodiments spot-weld the case body 3 and the reinforcement 5 to each other, so as to form a closed cross section to become a gas exhaust passage, such a structure is not restrictive in particular. The case body 3 and the reinforcement 5 may be joined together not only by spot welding but also by other means such as laser welding and bolting. A closed cross section to become a gas exhaust passage is not required to be formed by the case body 3 and the reinforcement 5 but may be formed by a pipe-like reinforcement alone, for example.

While the gaps 6 provided at a plurality of unwelded locations between the case body 3 and the reinforcement 5 are employed as the gas exhaust ports 8 by which the gases and hot wind having flown into the reinforcement 5 are let out of the battery case in the above-mentioned embodiments, the lower plate part of the reinforcement 5 may be perforated so as to form a gas exhaust port when there are no gaps 6 between the case body 3 and the reinforcement 5.

While the above-mentioned embodiments have a closed structure in which the reinforcement 5 is provided all around the outer side face of the case body 3, this structure is not restrictive; for example, only opposing two of the four outer side faces of the case body 3 may be provided with reinforcements, i.e., it will be sufficient if an outer surface of the case body 3 is provided with a reinforcement.

While a plurality of battery modules 2 are contained in the case body 3 in the above-mentioned embodiments, one battery module 2 may be contained alone in the case body 3.

What is claimed is:

1. A battery case mounted under a floor of a vehicle, the battery case comprising:
    a case body containing a plurality of battery modules, each of the battery modules being provided with an exhaust port for letting out gas generated within the battery module, the case body being provided with a gas circulation hole through which the gas inside the case body flows out;
    a cover for closing over an opening of the case body;
    an exhaust duct connecting all of the exhaust ports of the battery modules to the gas circulation hole of the case body, the exhaust duct extending upward within the case body from the exhaust ports of the battery modules to the cover; and
    a reinforcement member attached to an outer surface of the case body, the reinforcement member reinforcing the case body and defining therein a gas flow passage which is connected to the inside of the case body through the gas circulation hole of the case body;
    wherein the reinforcement member is provided with a gas exhaust port at the end of the gas flow passage for letting out the gas therethrough.

2. A battery case according to claim 1, wherein the case body or cover is provided with an air inlet part for introducing cooling air into the case body.

3. A battery case according to claim 1, wherein the reinforcement member is attached to the outer surface of the case body by welding at a plurality of spots;
    wherein a gap with the case body is formed between the welding spots of the reinforcement member; and
    wherein the gap forms the gas exhaust port.

4. A battery case according to claim 1, wherein the reinforcement member is provided all around the outer side surface of the case body.

5. A battery case mounted under a floor of a vehicle, the battery case comprising:
    a box-shaped case body containing therein a plurality of battery modules;
    a cover for closing the opening of the case body; and
    a reinforcement member attached to and reinforcing the case body, the reinforcement member being provided all around an outer side surface of the case body, the reinforcement member defining therein a passage through which exhaust gas generated in the battery modules flows, the passage being provided with a gas exhaust port at an end of the passage;
    wherein the case body is provided with a gas circulation hole connecting the space inside the case body with the passage within the reinforcement member, thereby letting the exhaust gas within the case body out through the passage and the gas exhaust port of the reinforcement member.

* * * * *